G. H. MATTESON.
CUSHION TIRE.
APPLICATION FILED NOV. 25, 1910.
1,006,665.
Patented Oct. 24, 1911.
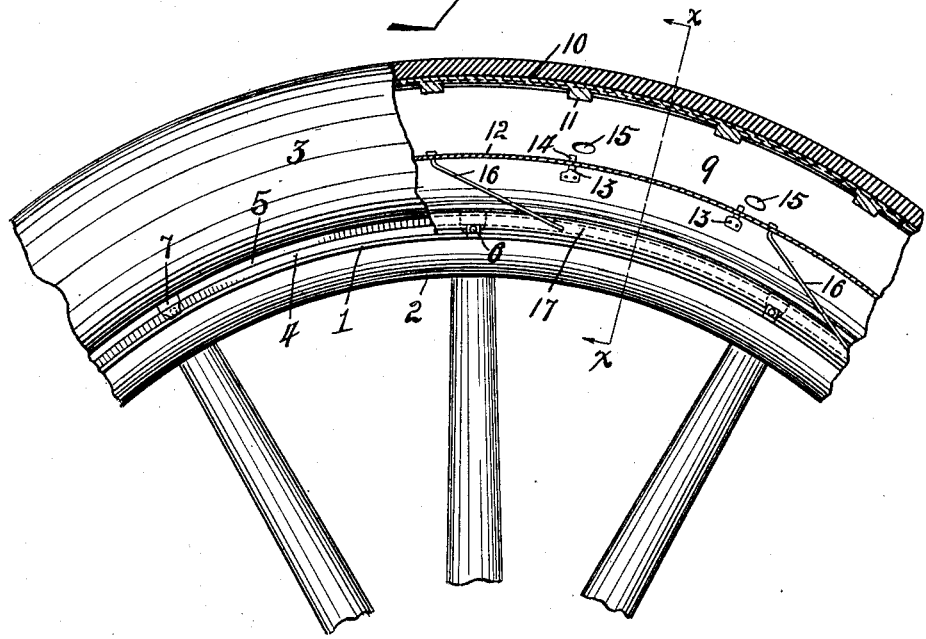
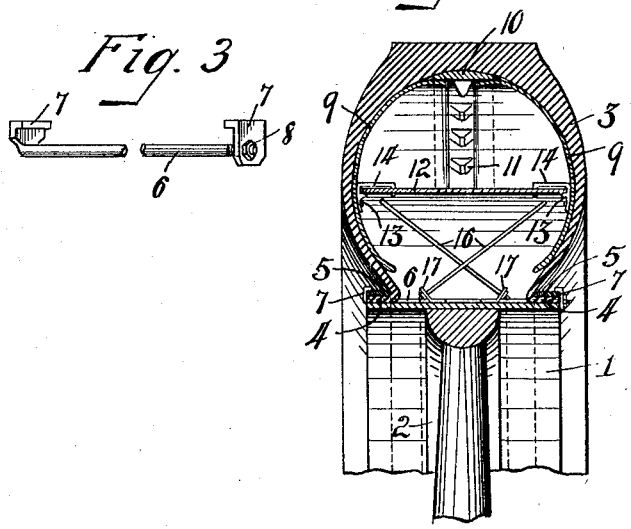
WITNESSES.
C. E. Walker.
G. H. Bills.
INVENTOR.
George H. Matteson,
By Owen & Owen,
His attys.

UNITED STATES PATENT OFFICE.

GEORGE H. MATTESON, OF TOLEDO, OHIO, ASSIGNOR OF ONE-HALF TO JOHN M. HAYES, OF TOLEDO, OHIO.

CUSHION-TIRE.

1,006,665.      Specification of Letters Patent.      Patented Oct. 24, 1911.

Application filed November 25, 1910. Serial No. 594,182.

*To all whom it may concern:*

Be it known that I, GEORGE H. MATTESON, a citizen of the United States, and a resident of Toledo, in the county of Lucas and State of Ohio, have invented a certain new and useful Cushion-Tire; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle tires of the cushion type, and is intended for use on the wheels of bicycles, carriages, automobiles and other kinds of vehicles.

The object of my invention is to improve upon the construction of tires described and claimed in my former United States Patent application Serial No. 539,835, filed January 24, 1910, whereby to cheapen the construction thereof, render the same capable of being more easily and quickly repaired, and to enhance the efficiency, practicability and commercial value thereof.

The invention is fully described in the following specification, and while in its broader aspect, it is capable of embodiment in numerous forms, a preferred embodiment thereof is illustrated in the accompanying drawings, in which,—

Figure 1 is a side elevation of a portion of the tire partly in section and mounted on the rim of a wheel. Fig. 2 is a cross-section on the line $x$ $x$ in Fig. 1, and Fig. 3 is an enlarged view in perspective of the casing-holding means.

Referring to the drawings, 1 designates a metal band, which is mounted upon the rim or felly 2 of the wheel, said band being shown as of greater width than the wheel rim to adapt its edges to project beyond the side edges of the rim to suit the width of the inner portion of a tire secured thereto.

Mounted upon the band 1 and encircling the same is the casing 3 of my improved tire, which casing has its inner side edges extending to such band and turned outwardly thereon to form feet 4 to facilitate a clamping of the same to the band. The feet or outwardly turned portions 4 of the inner edges of the casing 3 are clamped to the associated edges of the band 1 by clamping rings 5, which fit closely over said portions 4 to hold the same to the band 1, and bear at their edges against the casing at the point of angle of the portions 4 therefrom. The rings 5 when placed over the edges 4 of the casing are held against removal therefrom and also drawn toward each other to effect a tightening of the casing about the expanding parts as hereinafter described, by the coöperating action of a plurality of rods or bars 6 and clips 7, which clips are carried on the ends of said rods and adapted to engage the outer edges of the rings 5, one of the clips 7 of each rod being movably carried thereby and adjusted thereon by the threading of a nut 8 upon the rod outside of the movable clip, as is apparent.

Mounted within the hollow or interior of the casing 3 are the two annular plates or ring-like members 9, 9, which bear outwardly against opposite sides of the casing and are curved in cross-section to substantially conform to the intended or desired contour of the casing sides, as indicated in Fig. 2. These plates or rings are formed of resilient material to adapt them to yield under pressure, and each extends from a point adjacent to the inner edge of the associated casing side to adjacent the center of the tread portion of the tire, with the outer edge thereof preferably curved slightly inwardly from contact with the inner surface of the tread portion of the tire, as indicated.

In order to properly support the tire tread at the point intermediate of the outer spaced ends of the plates or rings 9, a ring 10 which has its outer surface curved or transversely bowed to suit the inner contour of the coacting casing surface, is fitted within the casing between the outer edges of the plates or rings 9 with its edges resting upon the adjacent edges of such plates whereby to coöperate therewith to resist a collapsing of the casing under internal stress. This ring is of resilient material to adapt it to yield under pressure, and, in order to keep it centered relative to the opening between the plates 9, is provided at intervals on its inner surface with lugs or spurs 11, which project inwardly between the outer edges of the plates 9, but in such manner as not to prevent inward oscillatory movements of such outer plate edges.

The plates or rings 9, 9 are spaced apart and held in contact with the casing sides by a spacing ring or band 12, which extends entirely around the interior of the tire at or adjacent to the center thereof with its outer edges bearing against the inner sides of the plates 9 intermediate their edges to serve as a fulcrum upon which each of the plates 9 may have transverse rocking movements at points of radial pressure thereon. The side edges of the ring 12 are intended to loosely seat within notched brackets 13, which are provided at intervals around the inner sides of the respective plates 9. These brackets are shown in the present instance as having spring fingers 14 projecting from their ends over the associated edge of the band 12 and angled at their free ends to adapt them to project through registering openings in the band to hold the brackets and attached plates 9 thereto when the casing 3 is removed from around the same. A disengagement of the fingers 14 from the band 12 may be effected by inserting the end of a screwdriver or other suitable instrument through adjacent openings 15 in the associated plate 9 for the purpose of prying such fingers from engagement with their respective openings.

To prevent a longitudinal creeping of the band 12 relative to the wheel band 1, the same is shown as being anchored thereto by a series of truss rods or members 16. These rods preferably but not necessarily extend from adjacent the opposite edges of the band 12 to which they are attached in any suitable manner diagonally thereof and are attached at their opposite ends to the rim of the band 1. A simple and desirable way of attaching the truss rods 16 to the wheel rim consists in securing two angle-iron bands 17 around the outer side of the band 1, the outwardly projecting flanges of which are perforated to receive the rods 16.

With this construction of tire it is apparent that the application of a compressing stress upon the tread thereof, such as would be applied by contact of the tire with the surface over which it is running will effect an inward yielding transversely rocking movement of the outer portions of the casing expanding plates or rings 9, 9 at the points of pressure thereon, and will also effect an outward movement of the adjacent inner edge portions of such plates due to the plates rocking at such points of radial pressure upon the spacing or fulcrum band 12. It is thus seen that the action of the plates 9, 9 cause the inner portion of the casing to expand to a sufficient extent to compensate for the radial collapsing of the outer or tread portion of the casing. It is also evident that the plates or rings 9, 9 will coöperate with the casing to give the tire considerable radial resiliency.

I wish it understood that my invention is not limited to any specific construction or arrangement of the parts except in so far as such limitations are specified in the claims.

Having thus described my invention, what I claim as new and desire to secure by Letters Patent, is,—

1. A cushion tire comprising in combination with a wheel rim, a casing secured to such rim, opposing annular expanding members bearing outwardly against the internal walls of the casing, a band coacting at its opposite edges with said members intermediate their inner and outer edges to space the same apart and serve as a fulcrum for each member to permit lateral oscillatory movements of the members about such fulcrums at points of radial pressure thereon, and means removably holding said band and members in engagement.

2. The combination with the rim of a wheel, of a tire comprising a casing secured to such rim, opposing annular expanding members bearing outwardly against the internal walls of the casing, a spacing band interposed between said members and bearing outwardly against each intermediate its inner and outer edges to serve as a fulcrum therefor, brackets forming seats for the edges of said band against said members and having spring fingers projecting therefrom for coacting with the band to normally hold said members in engagement therewith.

3. The combination with a wheel rim, of a casing secured to such rim, opposing annular expanding members bearing outwardly against the internal walls of the casing and terminating at their outer ends short of each other, means bracing said members apart and serving as fulcrums therefor to permit lateral oscillatory movements of the members about their respective fulcrums at points of radial pressure thereon, and a flexible ring-like member associated with the outer edges of said members to coöperate therewith to yieldingly resist inward pressure of the tread portion of the casing.

4. The combination with the rim of a wheel, of a casing secured thereto, opposing annular expanding members bearing outwardly against the internal walls of the casing and extending from adjacent the center of the tire tread to adjacent the inner edge of the respective walls of the casing, means bracing said members apart and adapted to permit oscillatory movements of the same at points of radial pressure upon the tire tread, a yielding band encircling the outer edges of said members and resting thereon whereby to coöperate with said members to yieldingly hold the casing expanded, said band having means for holding it centered relative to the space between the outer edges of said members.

5. The combination with the rim of a wheel, of a hollow casing secured thereto, annular casing expanding members bearing outwardly against the internal side walls of the casing, said members being transversely curved and yieldable, a band surrounding the rim within the casing and serving to brace said members apart and to form fulcrums upon which said members may oscillate at points of radial pressure thereon, angle-iron strips secured to and extending around the rim within the casing and truss bars connecting said band and strips for preventing relative rotary movements thereof.

In testimony whereof, I have hereunto signed my name to this specification in the presence of two subscribing witnesses.

GEORGE H. MATTESON.

Witnesses:
M. G. GASKELL,
C. W. OWEN.

Copies of this patent may be obtained for five cents each, by addressing the "Commissioner of Patents, Washington, D. C."